United States Patent
Wehner et al.

(10) Patent No.: US 7,168,805 B2
(45) Date of Patent: Jan. 30, 2007

(54) METHOD FOR OPTIMIZING A PROGRESSIVE SPECTACLE LENS

(75) Inventors: Edda Wehner, Emmering (DE); Andrea Welk, Munich (DE); Gregor Esser, Munich (DE); Helmut Altheimer, Baisweil-Lauchdorf (DE); Walter Haimerl, Munich (DE)

(73) Assignee: Rodenstock GmbH, Munich (DE)

( * ) Notice: Subject to any disclaimer, the term of this patent is extended or adjusted under 35 U.S.C. 154(b) by 60 days.

(21) Appl. No.: 11/222,826

(22) Filed: Sep. 12, 2005

(65) Prior Publication Data

US 2006/0055881 A1  Mar. 16, 2006

Related U.S. Application Data

(63) Continuation-in-part of application No. PCT/EP2003/14619, filed on Dec. 19, 2003.

(30) Foreign Application Priority Data

Mar. 10, 2003 (DE) .................................. 103 10 354

(51) Int. Cl.
G02C 7/06 (2006.01)

(52) U.S. Cl. ...................................... 351/177; 351/169

(58) Field of Classification Search ................. 351/169, 351/177
See application file for complete search history.

(56) References Cited

U.S. PATENT DOCUMENTS 5,861,935 A * 1/1999 Morris et al. ................ 351/169
6,824,268 B2 * 11/2004 Rubinstein et al. .......... 351/177

FOREIGN PATENT DOCUMENTS

| WO | WO 01/81979 | 11/2001 |
| WO | WO 02/061496 | 8/2002 |
| WO | WO 02/088826 | 11/2002 |
| WO | WO 03/01929 | 3/2003 |

* cited by examiner

Primary Examiner—Scott J. Sugarman
(74) Attorney, Agent, or Firm—Crowell & Moring LLP

(57) ABSTRACT

A method of optimizing a progressive lens is described.

This invention is characterized by the following steps:
  selecting a preset progressive lens having a preset object distance function $A1(x,y)$,
  selecting an object distance function $A2(x=x_0,y)$ along the main line of vision of the preset progressive lens for a lens that is to be derived,
  locating the map $U:y \to y'$ along the main line of vision, such that the value $y'$ for which the following holds is calculated for each value of $y$:

$$A1(x=x_0,y)=A2(x=x_0,y'),$$

calculating the setpoint values $S(x,y)$ at $$S(x,y')=S(x,U(y)).$$

9 Claims, 6 Drawing Sheets

Abb. 2b

Abb. 3b

Abb. 1a

Abb. 1b

METHOD FOR OPTIMIZING A PROGRESSIVE SPECTACLE LENS

BACKGROUND OF THE INVENTION

The present application is a continuation-in-part of PCT/EP2003/14619 filed on Dec. 19, 2003.

The present invention relates to a method for optimizing a progressive eyeglass lens.

With the known optimization method, new setpoint values, each of which is to be developed separately, are determined for each new design to be developed. These technologies are extremely labor intensive.

In a so-called least-squares optimization method, ideal values are defined for all assessment points on an eyeglass lens. These ideal values stipulate how the lens is to appear at the end of the optimization method. In doing so, the optimization method minimizes the difference between the prevailing values and the setpoint values over all assessment points. When a lens that is to have freely selectable progression zone lengths is to be developed, a corresponding setpoint value must be determined for each progression length. Such methods are complex and are also very labor intensive even on a computer.

SUMMARY OF THE INVENTION

An object of this invention is to provide a method of optimizing an eyeglass lens in which a progressive eyeglass lens is to be derived from an original progressive eyeglass lens having given setpoint values $S(x,y)$ and a given object distance function $A1(x,y)$.

This object has been achieved by selecting a preset progressive lens having a preset object distance function $A1(x,y)$, selecting an object distance function $A2(x=x_0,y)$ along the main line of vision of the preset progressive vision lens for an optical lens to be derived, locating the map $U: y \to y'$ along the main line of vision, such that for each value of y, the value y' for which the following holds is calculated:

$$A1(x=x_0,y)=A2(x=x_0,y'), \text{ and}$$

calculating the setpoint values $S(x,y)$ at $S(x,y')=S(x,U(y))$.

The starting point is thus the object distance surface $A1(x,y)$, where x is a horizontal component and y is a vertical component. If we consider the plot of this object distance surface along the main line of vision $x_0(y)$, this yields a one-dimensional function for the object distance $A1(x=x_0(y),y)$ for each progressive lens. Progressive lenses having different progression lengths differ in their different object distance surfaces.

The following procedure is used to derive a lens having an object distance function $A2(y)$ from a progressive lens having an object distance $A1(y)$ along the main line of vision.

A value y is inserted into the function $A1(y)$, thus yielding the value of the object distance function. Using an iterative numerical method, the coordinate y' at which the function $A2(y')$ has the same value is sought. This method is repeated for all y values that are relevant for the lens, thus yielding a map $U: y \to y'$ point by point.

The following calculation of the setpoint values for the novel eyeglass lens is performed at $y'=U(y)$.

The setpoint functions are thus "compressed" in the vertical direction. The advantage of this new method is that the novel specifications need not be found manually in a complex procedure and include the characteristics of the original specifications. A progressive lens produced in this way thus retains the design of the original lens despite the fact that the progression channel is shortened or lengthened.

Especially with low additions, it may occasionally occur that the transformation function $U(y)$ thus found is "rough" on a small-scale level. This may originate from rounding errors from the iteration process, for example, and has a negative effect on the setpoint values thus derived.

This roughness can be prevented by not using $U(y)$ as the transformation function but instead using a function $V(y)$ which is very similar to the transformation function $U(y)$ and is determined by a best-fit method that prevents microroughness.

Table 1 shows the arrow heights of the original surface on the example of a back surface and the arrow heights of the derived surface. The first row shows the x coordinate and the first column shows the y coordinate.

Figure 5:
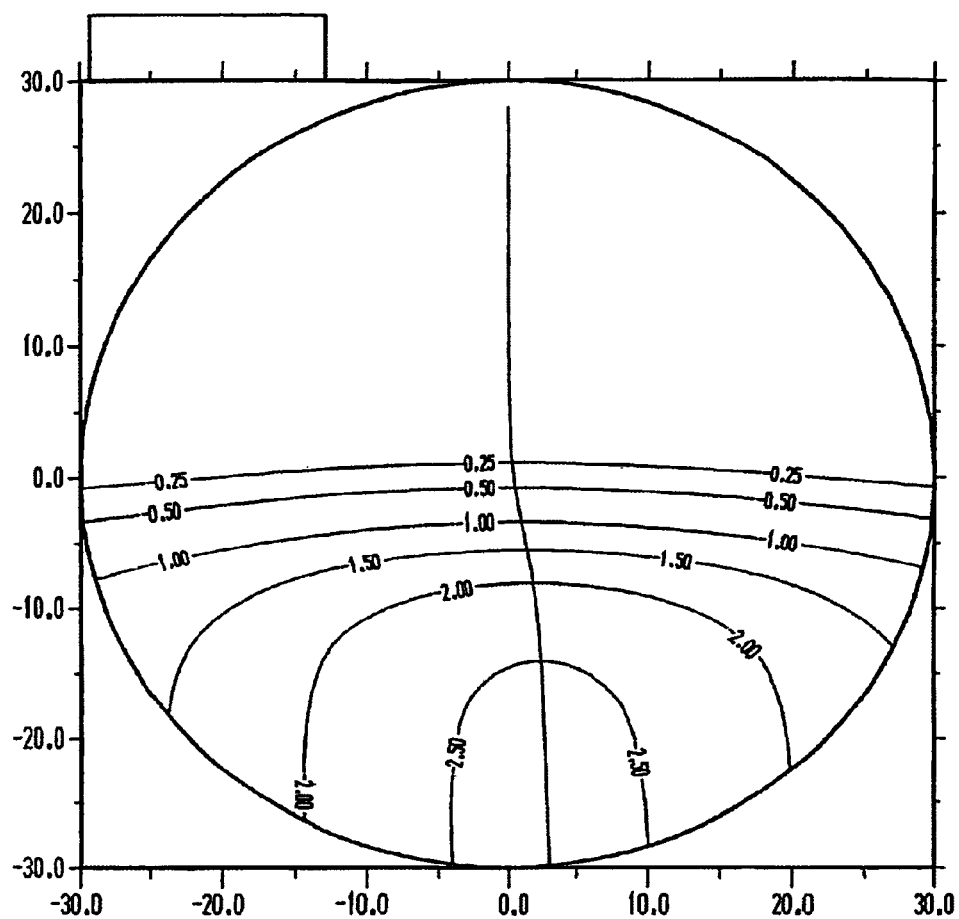
FIG. 5 is a chart showing the original object distance surface.
Figure 6:
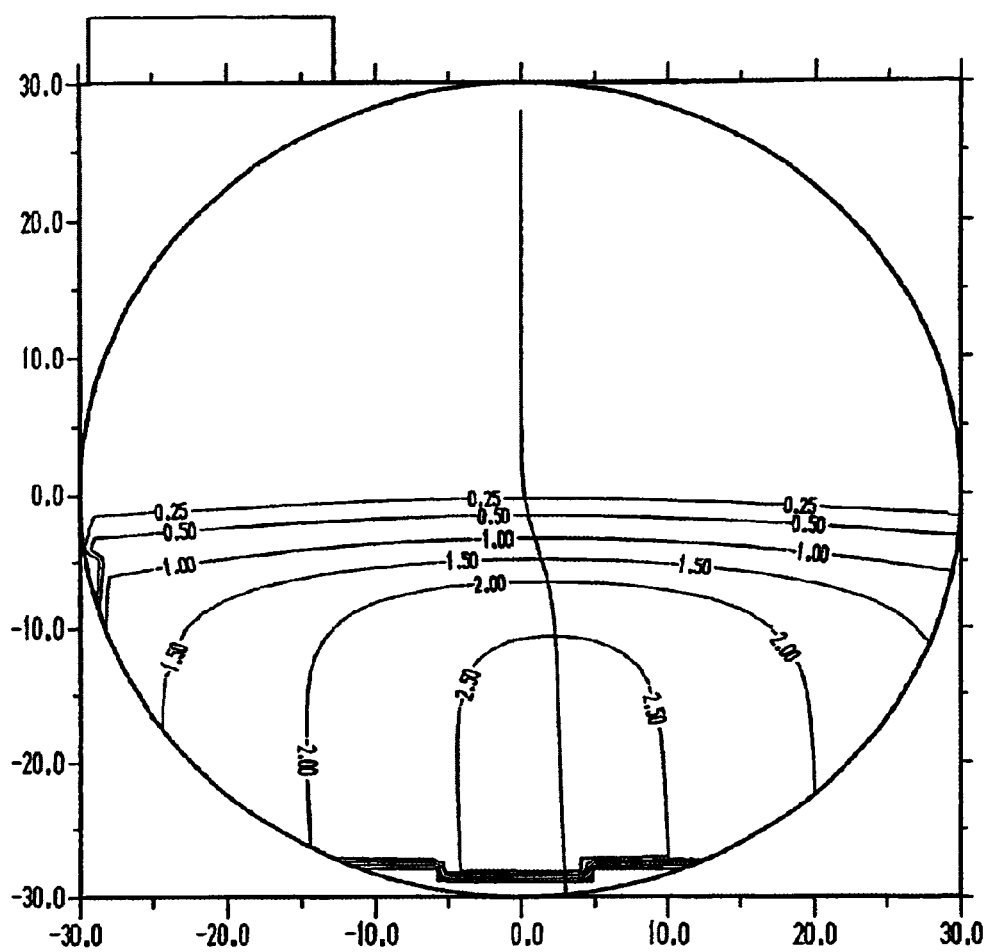
FIG. 6 is a chart showing the derived object distance surface.

FIG. 5 shows one example of an original object distance surface and FIG. 6 the derived object distance surface. As seen from FIGS. 5 and 6, the y-coordinate of the object distance of the derived object distance surface begins to decrease lateron in a direction from the top to the bottom of the lens (in a direction from the far to the near distance portion) than the y-coordinate of the object distance of the original object surface. The y-coordinate of the object distance of the derived object surface decreases, however, considerably faster than that of the original object surface, so that the near object distance of −40 cm, respectively −2.50 dpt, is reached considerably earlier.

Figure 4:
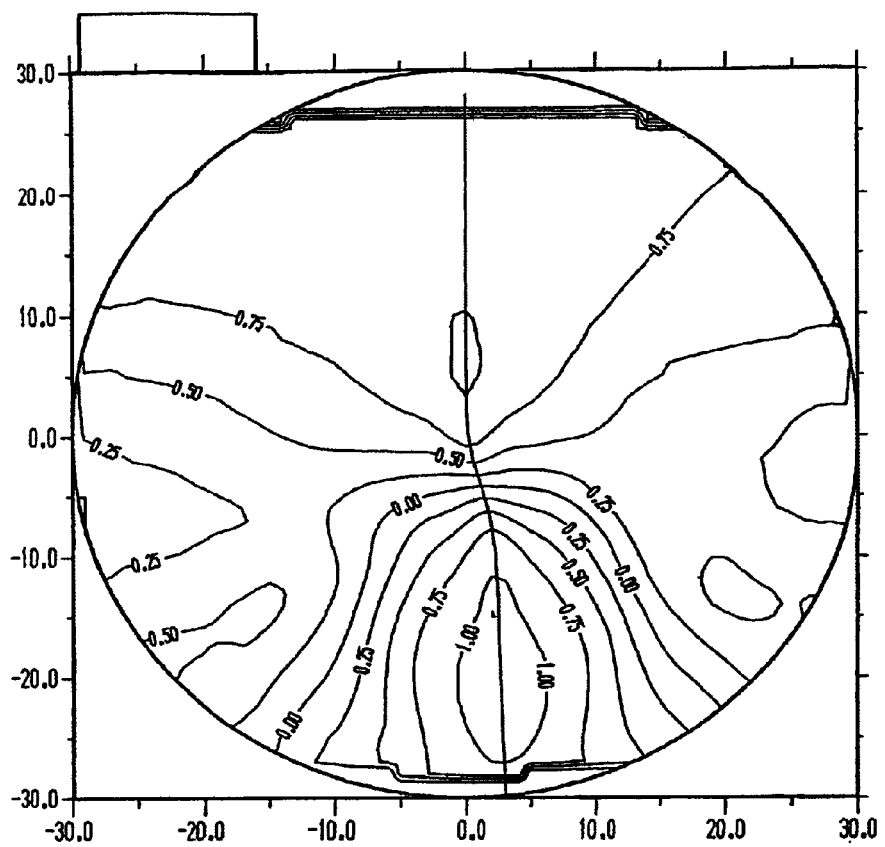
FIG. 4 is a chart showing the refractive value of the derived surface.

The lens calculated according to a preferred embodiment of the inventive method (shown on FIGS. 2 and 4) is characterized by a considerably shorter progression length without, however, a substantial change in the remaining design characteristics. As seen from FIG. 4 the progression length is substantially reduced, as the −1.00 dpt isoline of equal refractive power in the distance vision portion is vertically stretched in a downwards direction (in a direction to the bottom or the near vision portion of the lens), the isolines of the equal refractive power in the progressive zone are denser (the distance between two isolines is smaller) and the refractive power of +1.00 dpt is reached earlier. The changes in other lens areas are only slight. Thus, for example the number of isolines of equal refractive power remains substantially unchanged and the distance and near-vision portions are only slightly smaller than the distance and near vision portion of the original lens.

Figure 1:
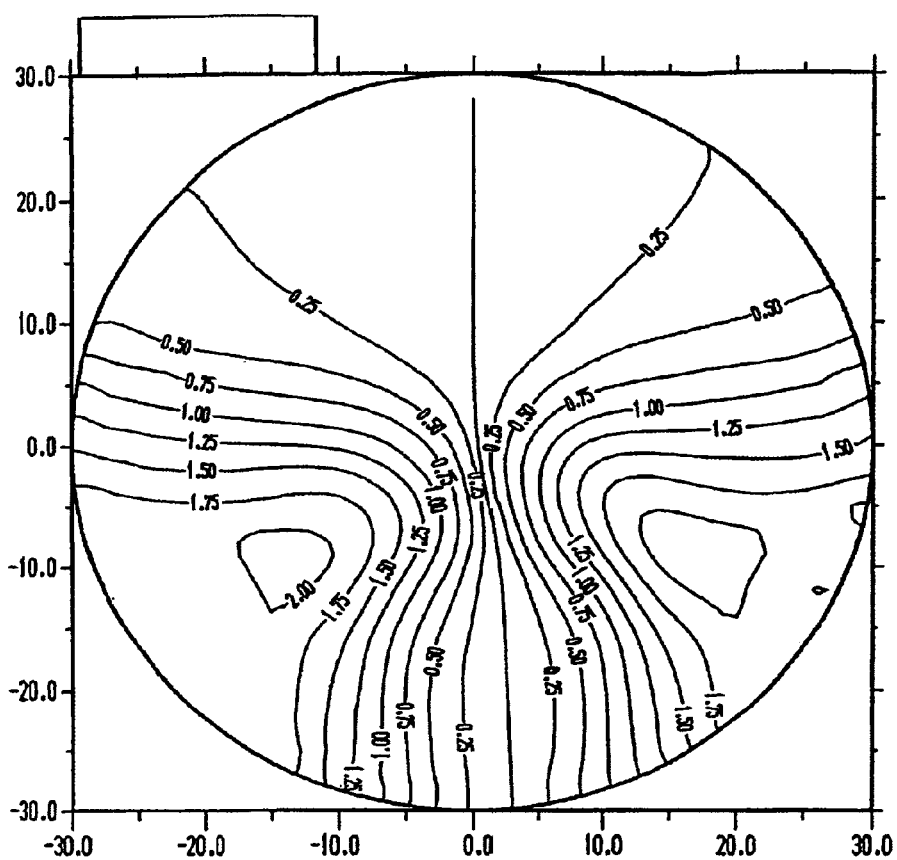
FIG. 1 is a chart showing the astigmatism of the original lens surface.
Figure 2:
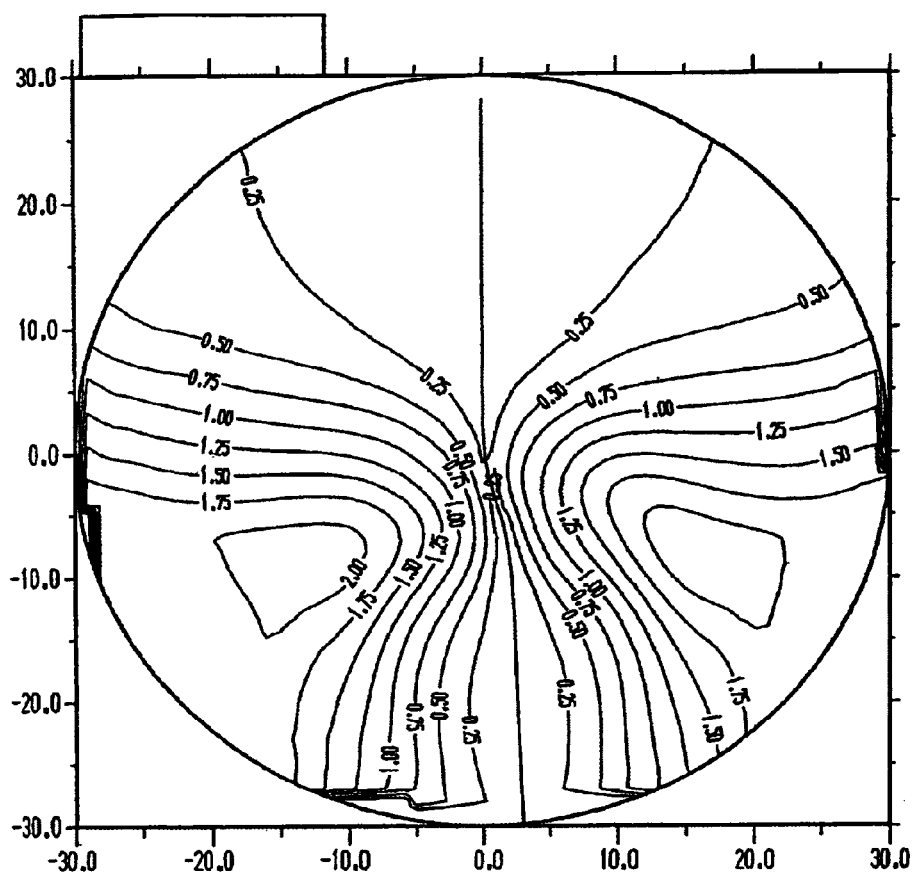
FIG. 2 is a chart showing the astigmatism of the derived surface.
Figure 3:
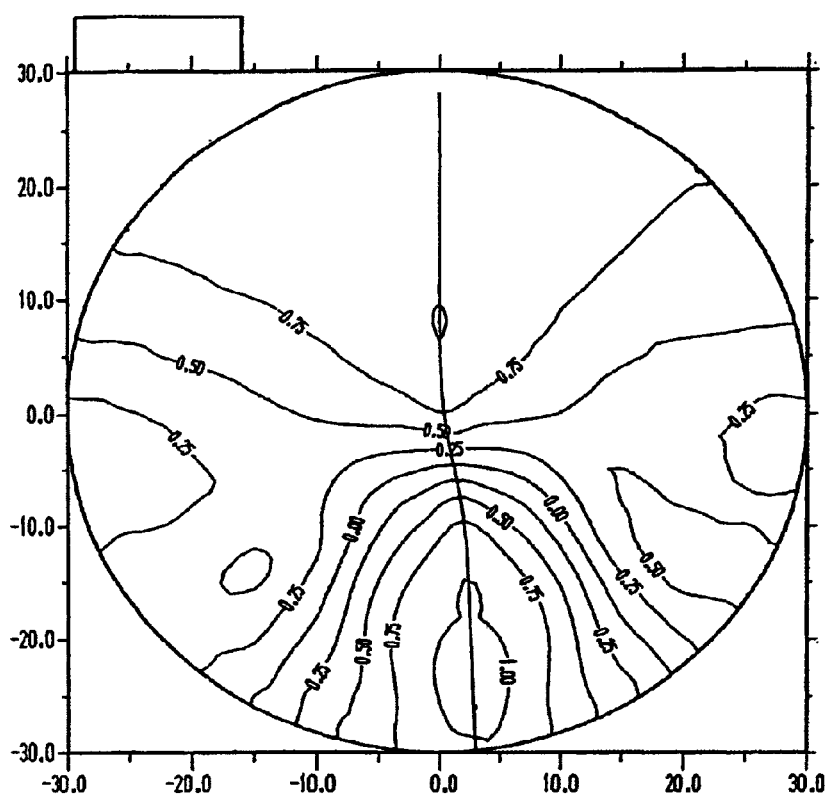
FIG. 3 is a chart showing the refractive value of the original surface.

A comparison of FIGS. 1 and 2 showing the astigmatism of the original (FIG. 1a) and the derived surface (FIG. 2) confirms that the derived lens substantially retains the original lens design. Thus for example, the derived lens surface exhibits only slightly smaller vision portions and a minimal increase in the maximum astigmatism value, the position of the maximum astigmatism, however, remains substantially unchanged. Furthermore, there are no additional astigmatism isolines and the position the individual astigmatism isolines remains substantially unchanged.

TABLE 1

Sagittal or Elevational Heights of the Original Surface
The first line contains the x coordinate, the first column, the y coordinate

| 0.00000 | −20.00000 | −17.50000 | −15.00000 | −12.50000 | −10.00000 | −7.50000 | −5.00000 | −2.50000 | 0.00000 |
|---|---|---|---|---|---|---|---|---|---|
| 20.00000 | 3.64860 | 3.21935 | 2.84876 | 2.53645 | 2.28221 | 2.08590 | 1.94755 | 1.86721 | 1.84490 |
| 17.50000 | 3.20847 | 2.78110 | 2.41197 | 2.10074 | 1.84722 | 1.65136 | 1.51325 | 1.43303 | 1.41076 |
| 15.00000 | 2.82685 | 2.40130 | 2.03362 | 1.72346 | 1.47065 | 1.27521 | 1.13731 | 1.05716 | 1.03491 |
| 12.50000 | 2.50295 | 2.07923 | 1.71309 | 1.40412 | 1.15213 | 0.95717 | 0.81949 | 0.73941 | 0.71715 |
| 10.00000 | 2.23584 | 1.81402 | 1.44958 | 1.14207 | 0.89118 | 0.69693 | 0.55962 | 0.47965 | 0.45738 |
| 7.50000 | 2.02435 | 1.60456 | 1.24206 | 0.93636 | 0.68708 | 0.49407 | 0.35752 | 0.27788 | 0.25563 |
| 5.00000 | 1.86694 | 1.44945 | 1.08928 | 0.78590 | 0.53888 | 0.34787 | 0.21288 | 0.13411 | 0.11212 |
| 2.50000 | 1.76114 | 1.34639 | 0.98911 | 0.68883 | 0.44506 | 0.25729 | 0.12511 | 0.04821 | 0.02689 |
| 0.00000 | 1.70460 | 1.29312 | 0.93945 | 0.64321 | 0.40389 | 0.22077 | 0.09293 | 0.01937 | −0.00048 |
| −2.50000 | 1.69510 | 1.28745 | 0.93810 | 0.64688 | 0.41328 | 0.23626 | 0.11422 | 0.04535 | 0.02820 |
| −5.00000 | 1.73086 | 1.32764 | 0.98323 | 0.69768 | 0.47063 | 0.30075 | 0.18563 | 0.12249 | 0.10897 |
| −7.50000 | 1.81061 | 1.41243 | 1.07368 | 0.79438 | 0.57428 | 0.41182 | 0.30386 | 0.24659 | 0.23682 |
| −10.00000 | 1.93451 | 1.54180 | 1.20900 | 0.93636 | 0.72335 | 0.56805 | 0.46667 | 0.41452 | 0.40782 |
| −12.50000 | 2.10408 | 1.71710 | 1.39032 | 1.12431 | 0.91806 | 0.76905 | 0.67292 | 0.62451 | 0.61982 |
| −15.00000 | 2.32078 | 1.93977 | 1.61915 | 1.35925 | 1.15849 | 1.01404 | 0.92145 | 0.87545 | 0.87190 |
| −17.50000 | 2.58570 | 2.21052 | 1.89547 | 1.64046 | 1.44359 | 1.30195 | 1.21136 | 1.16673 | 1.16386 |
| −20.00000 | 2.89865 | 2.52849 | 2.21797 | 1.96661 | 1.77231 | 1.63209 | 1.54225 | 1.49824 | 1.49589 |

| 0.00000 | 2.50000 | 5.00000 | 7.50000 | 10.00000 | 12.50000 | 15.00000 | 17.50000 | 20.00000 |
|---|---|---|---|---|---|---|---|---|
| 20.00000 | 1.88060 | 1.97419 | 2.12552 | 2.33437 | 2.60061 | 2.92421 | 3.30528 | 3.74413 |
| 17.50000 | 1.44644 | 1.53995 | 1.69106 | 1.89946 | 2.16489 | 2.48725 | 2.86663 | 3.30331 |
| 15.00000 | 1.07056 | 1.16398 | 1.31487 | 1.52279 | 1.78737 | 2.10843 | 2.48605 | 2.92054 |
| 12.50000 | 0.75277 | 0.84608 | 0.99668 | 1.20399 | 1.46753 | 1.78708 | 2.16276 | 2.59497 |
| 10.00000 | 0.49299 | 0.58612 | 0.73623 | 0.94262 | 1.20472 | 1.52237 | 1.89584 | 2.32560 |
| 7.50000 | 0.29121 | 0.38397 | 0.53316 | 0.73800 | 0.99802 | 1.31327 | 1.68414 | 2.11119 |
| 5.00000 | 0.14754 | 0.23948 | 0.38693 | 0.58929 | 0.84637 | 1.15848 | 1.52618 | 1.95007 |
| 2.50000 | 0.06203 | 0.15233 | 0.29676 | 0.49523 | 0.74810 | 1.05604 | 1.41973 | 1.83985 |
| 0.00000 | 0.03414 | 0.12172 | 0.26162 | 0.45453 | 0.70164 | 1.00416 | 1.36291 | 1.77852 |
| −2.50000 | 0.06216 | 0.14618 | 0.28029 | 0.46600 | 0.70570 | 1.00143 | 1.35419 | 1.76454 |
| −5.00000 | 0.14276 | 0.22301 | 0.35094 | 0.52869 | 0.75977 | 1.04738 | 1.39300 | 1.79718 |
| −7.50000 | 0.27119 | 0.34836 | 0.47077 | 0.64114 | 0.86361 | 1.14245 | 1.47993 | 1.87675 |
| −10.00000 | 0.44299 | 0.51843 | 0.63680 | 0.80123 | 1.01618 | 1.28664 | 1.61570 | 2.00464 |
| −12.50000 | 0.65565 | 0.73053 | 0.84661 | 1.00708 | 1.21634 | 1.47973 | 1.80101 | 2.18230 |
| −15.00000 | 0.90819 | 0.98317 | 1.09837 | 1.25661 | 1.46229 | 1.72071 | 2.03588 | 2.41030 |
| −17.50000 | 1.20045 | 1.27587 | 1.39096 | 1.54827 | 1.75217 | 2.00763 | 2.31855 | 2.68756 |
| −20.00000 | 1.53289 | 1.60872 | 1.72404 | 1.88132 | 2.08479 | 2.33887 | 2.64703 | 3.01205 |

Sagittal or Elevational Heights of the derived surface

| 0.00000 | −20.00000 | −17.50000 | −15.00000 | −12.50000 | −10.00000 | −7.50000 | −5.00000 | −2.50000 | 0.00000 |
|---|---|---|---|---|---|---|---|---|---|
| 20.00000 | 3.67944 | 3.24730 | 2.87428 | 2.55994 | 2.30400 | 2.10627 | 1.96671 | 1.88530 | 1.86201 |
| 17.50000 | 3.23433 | 2.80434 | 2.43303 | 2.11998 | 1.86497 | 1.66789 | 1.52878 | 1.44769 | 1.42467 |
| 15.00000 | 2.84829 | 2.42039 | 2.05075 | 1.73898 | 1.48485 | 1.28835 | 1.14961 | 1.06878 | 1.04595 |
| 12.50000 | 2.52044 | 2.09462 | 1.72675 | 1.41634 | 1.16319 | 0.96731 | 0.82893 | 0.74830 | 0.72561 |
| 10.00000 | 2.24973 | 1.82606 | 1.46012 | 1.15136 | 0.89947 | 0.70442 | 0.56651 | 0.48610 | 0.46350 |
| 7.50000 | 2.03491 | 1.61355 | 1.24978 | 0.94304 | 0.69292 | 0.49922 | 0.36215 | 0.28213 | 0.25961 |
| 5.00000 | 1.87434 | 1.45557 | 1.09441 | 0.79026 | 0.54258 | 0.35103 | 0.21557 | 0.13643 | 0.11421 |
| 2.50000 | 1.76554 | 1.34984 | 0.99192 | 0.69118 | 0.44703 | 0.25891 | 0.12637 | 0.04909 | 0.02752 |
| 0.00000 | 1.70641 | 1.29435 | 0.94042 | 0.64409 | 0.40473 | 0.22152 | 0.09352 | 0.01967 | −0.00048 |
| −2.50000 | 1.69506 | 1.28724 | 0.93804 | 0.64706 | 0.41369 | 0.23684 | 0.11490 | 0.04608 | 0.02889 |
| −5.00000 | 1.72948 | 1.32640 | 0.98239 | 0.69733 | 0.47068 | 0.30115 | 0.18644 | 0.12378 | 0.11077 |
| −7.50000 | 1.80769 | 1.40967 | 1.07126 | 0.79240 | 0.57273 | 0.41082 | 0.30362 | 0.24721 | 0.23819 |
| −10.00000 | 1.92959 | 1.53666 | 1.20392 | 0.93152 | 0.71887 | 0.56422 | 0.46378 | 0.41262 | 0.40666 |
| −12.50000 | 2.09639 | 1.70869 | 1.38170 | 1.11579 | 0.90978 | 0.76137 | 0.66616 | 0.61864 | 0.61456 |
| −15.00000 | 2.30951 | 1.92745 | 1.60649 | 1.34656 | 1.14592 | 1.00194 | 0.91007 | 0.86473 | 0.86156 |
| −17.50000 | 2.57050 | 2.19410 | 1.87860 | 1.62343 | 1.42651 | 1.28508 | 1.19487 | 1.15055 | 1.14776 |
| −20.00000 | 2.87965 | 2.50807 | 2.19693 | 1.94528 | 1.75065 | 1.61026 | 1.52033 | 1.47618 | 1.47354 |

| 0.00000 | 2.50000 | 5.00000 | 7.50000 | 10.00000 | 12.50000 | 15.00000 | 17.50000 | 20.00000 |
|---|---|---|---|---|---|---|---|---|
| 20.00000 | 1.89677 | 1.98943 | 2.13972 | 2.34737 | 2.61213 | 2.93390 | 3.31277 | 3.74900 |
| 17.50000 | 1.45963 | 1.55240 | 1.70267 | 1.91002 | 2.17411 | 2.49476 | 2.87200 | 3.30608 |
| 15.00000 | 1.08106 | 1.17392 | 1.32412 | 1.53113 | 1.79447 | 2.11389 | 2.48940 | 2.92129 |
| 12.50000 | 0.76084 | 0.85373 | 1.00376 | 1.21027 | 1.47263 | 1.79057 | 2.16413 | 2.59369 |
| 10.00000 | 0.49884 | 0.59167 | 0.74132 | 0.94696 | 1.20790 | 1.52391 | 1.89520 | 2.32222 |
| 7.50000 | 0.29505 | 0.38761 | 0.53642 | 0.74053 | 0.99935 | 1.31285 | 1.68140 | 2.10555 |
| 5.00000 | 0.14962 | 0.24148 | 0.38858 | 0.59015 | 0.84587 | 1.15602 | 1.52116 | 1.94193 |

TABLE 1-continued

| | | | | | | | | |
|---|---|---|---|---|---|---|---|---|
| 2.50000 | 0.06281 | 0.15313 | 0.29714 | 0.49460 | 0.74580 | 1.05144 | 1.41227 | 1.82898 |
| 0.00000 | 0.03446 | 0.12204 | 0.26127 | 0.45275 | 0.69772 | 0.99751 | 1.35302 | 1.76491 |
| −2.50000 | 0.06310 | 0.14690 | 0.27990 | 0.46358 | 0.70057 | 0.99309 | 1.34221 | 1.74848 |
| −5.00000 | 0.14478 | 0.22435 | 0.35068 | 0.52590 | 0.75377 | 1.03774 | 1.37931 | 1.77898 |
| −7.50000 | 0.27293 | 0.34914 | 0.46974 | 0.63741 | 0.85647 | 1.13145 | 1.46461 | 1.85659 |
| −10.00000 | 0.44212 | 0.51668 | 0.63330 | 0.79520 | 1.00689 | 1.27356 | 1.59830 | 1.98229 |
| −12.50000 | 0.65050 | 0.72460 | 0.83908 | 0.99725 | 1.20353 | 1.46339 | 1.78056 | 2.15693 |
| −15.00000 | 0.89773 | 0.97194 | 1.08570 | 1.24185 | 1.44483 | 1.69998 | 2.01129 | 2.38094 |
| −17.50000 | 1.18401 | 1.25862 | 1.37236 | 1.52778 | 1.72924 | 1.98169 | 2.28896 | 2.65340 |
| −20.00000 | 1.51000 | 1.58492 | 1.69894 | 1.85454 | 2.05583 | 2.30715 | 2.61187 | 2.97245 |

The invention claimed is:

1. Method for optimizing a progressive lens, comprising:
    selecting a preset progressive lens having a preset object distance function A1(x,y),
    selecting an object distance function A2(x=$x_0$,y) along the main line of vision of the preset progressive lens for a lens to be derived,
    locating a map U:y→y' along a main line of vision such that the value y' for which the following holds is calculated for each value of y:

$A1(x=x_0,y)=A2(x=x_0,y')$, and calculating setpoint values S(x,y) at $S(x,y')=S(x,U(y))$.

2. Method as claimed in claim 1, wherein the transformation function U(y) is a best-fit function V(y) to the function U(y).

3. Method as claimed in claim 1, wherein the derived lens is optimized with the calculated setpoint values S(x,y') thus determined, where y'=U(y) or y'=V(y), using an optimization method, in particular a least-squares method.

4. Method as claimed in claim 1, wherein the surface thus determined is on a front surface or on a back surface.

5. Method as claimed in claim 3, wherein the optimization method is a least-squares method.

6. Method as claimed in claim 3, wherein the transformation function U(y) is a best-fit function V(y) to the function U(y).

7. Method as claimed in claim 4, wherein the transformation function U(y) is a best fit function V(y) to the function U(y).

8. Method as claimed in claim 7, wherein the derived lens is optimized with the calculated setpoint values S(x,y') thus determined, where y'=U(y) or y'=V(y), using an optimization method, in particular a least-squares method.

9. Method as claimed in claim 8, wherein the optimization method is a least-squares method.

* * * * *